(12) United States Patent
Wakasugi

(10) Patent No.: US 10,844,822 B2
(45) Date of Patent: Nov. 24, 2020

(54) VEHICLE CONTROL DEVICE, VEHICLE CONTROL METHOD, AND PROGRAM

(71) Applicant: MITSUBISHI HEAVY INDUSTRIES ENGINEERING, LTD., Kanagawa (JP)

(72) Inventor: Kazuyuki Wakasugi, Tokyo (JP)

(73) Assignee: MITSUBISHI HEAVY INDUSTRIES ENGINEERING, LTD., Kanagawa (JP)

( * ) Notice: Subject to any disclaimer, the term of this patent is extended or adjusted under 35 U.S.C. 154(b) by 0 days.

(21) Appl. No.: 16/486,845

(22) PCT Filed: Feb. 21, 2018

(86) PCT No.: PCT/JP2018/006208
§ 371 (c)(1),
(2) Date: Aug. 19, 2019

(87) PCT Pub. No.: WO2018/155489
PCT Pub. Date: Aug. 30, 2018

(65) Prior Publication Data
US 2020/0011282 A1 Jan. 9, 2020

(30) Foreign Application Priority Data
Feb. 21, 2017 (JP) ................. 2017-029641

(51) Int. Cl.
*F02N 11/08* (2006.01)
*G06N 20/00* (2019.01)
(52) U.S. Cl.
CPC ...... *F02N 11/0829* (2013.01); *F02N 11/0837* (2013.01); *G06N 20/00* (2019.01)

(58) Field of Classification Search
CPC .. F02N 11/08; F02N 11/0829; F02N 11/0837; G06N 20/00
See application file for complete search history.

(56) References Cited

FOREIGN PATENT DOCUMENTS

| GB | 2529294 A | 2/2016 |
|---|---|---|
| JP | 2004208416 A | 7/2004 |

(Continued)

OTHER PUBLICATIONS

International Search Report and Written Opinion for International Application No. PCT/JP2018/006208 dated May 29, 2019; 11 pp.

(Continued)

*Primary Examiner* — Hieu T Vo
(74) *Attorney, Agent, or Firm* — Kanesaka Berner and Partners LLP

(57) ABSTRACT

A model formula representing the relationship between an error between a predetermined stopping position and an actually-stopped position of a vehicle indicating the result of an automatic stop control, which controls the vehicle to stop at the predetermined stopping position using running-condition parameters, and the running-condition parameters used for the automatic stop control is calculated via machine learning. A stopping error is estimated with respect to the next stopping position, at which the vehicle currently running is going to stop, according to the model formula which is calculated in the past. The changing parameter to be changed is specified among the running-condition parameters, and then the changing parameter used for the automatic stop control is updated with a correction value configured to correct the stopping error of the vehicle.

10 Claims, 6 Drawing Sheets

(56) References Cited

FOREIGN PATENT DOCUMENTS

| JP | 2006320037 A | 11/2006 |
|----|--------------|---------|
| JP | 2010104084 A | 5/2010  |
| JP | 5395398 B    | 1/2014  |
| JP | 2016019411 A | 2/2016  |

OTHER PUBLICATIONS

International Search Report and Written Opinion for International Application No. PCT/JP2018/006208 dated May 29, 2018; 11 pp.

FIG. 5

| DEPARTURE STATION | ARRIVAL STATION | STOPPING ERROR | PARAMETER 1 | PARAMETER 2 | ... |
|---|---|---|---|---|---|
| A | B | 3cm | 3 | 1 | |
| B | C | 5cm | 3 | 1 | |
| C | D | 7cm | 3 | 1 | |
| D | C | 2cm | 3 | 1 | |
| C | B | −10cm | 3 | 1 | |
| B | A | 2cm | 3 | 1 | |

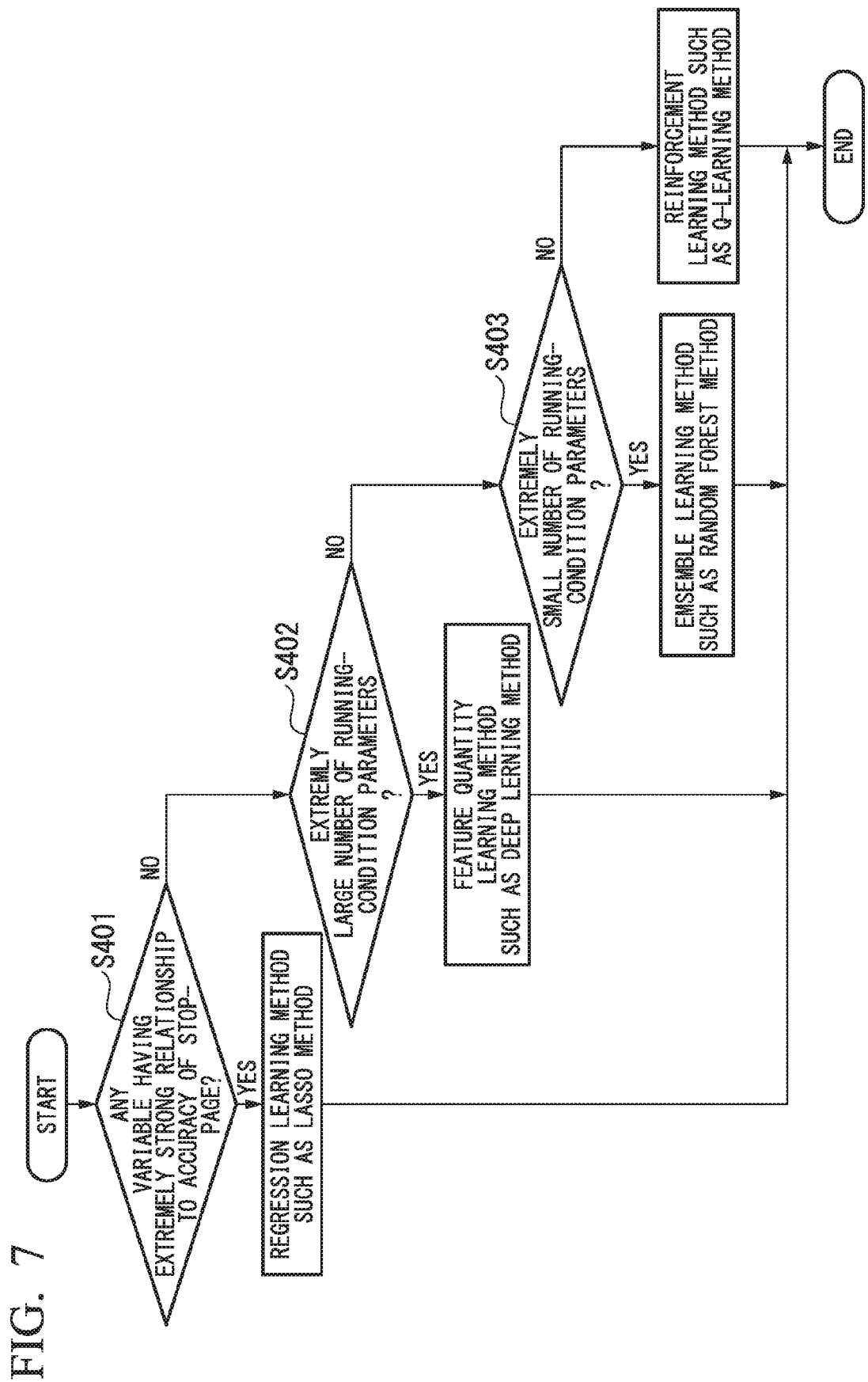

VEHICLE CONTROL DEVICE, VEHICLE CONTROL METHOD, AND PROGRAM

RELATED APPLICATIONS

The present application is based on International Application Number PCT/JP2018/006208 filed Feb. 21, 2018 and claims priority from Japanese Application Number 2017-029641 filed Feb. 21, 2017.

TECHNICAL FIELD

The present invention relates to a vehicle control device, a vehicle control method, and a program.

The present application claims the benefit of priority on Japanese Patent Application No. 2017-29641 filed on Feb. 21, 2017, the subject matter of which is incorporated herein by reference.

BACKGROUND ART

Patent Documents 1 and 2 disclose a technology to stop a vehicle at a predetermined stopping position in connection with an automated driving technology of vehicles.

CITATION LIST

Patent Literature Document

Patent Document 1: Japanese Patent No. 5395398
Patent Document 2: Japanese Patent Application Publication No. 2016-19411

SUMMARY OF INVENTION

Technical Problem

Patent Document 1 discloses a method for improving accuracy of stoppage by selecting appropriate parameters during train traveling among adjustment parameters which are held according to conditions on sunny days or rainy days.

Patent Document 2 discloses a method how to learn train characteristics considering movements of trains and driving force during traveling.

However, it is difficult for the technology of Patent Document 1 to sense road surface conditions and individual differences of brakes; hence, it is assumed that it is difficult to smoothly switch over dynamic characteristic models according to different conditions.

The technology of Patent Document 2 is designed to learn train characteristics considering movements of trains and driving force during traveling. However, the technology of Patent Document 2 may provide models considering disturbances such as communication delays and noise occurring in sensing speed, which may raise concern about a large amount of stopping error in a real machine.

The present invention aims to provide a vehicle control device, a vehicle control method, and a program, which can control vehicles to stop at predetermined stopping positions accurately under various conditions.

Solution to Problem

In a first aspect of the invention, a vehicle control device includes a learning part configured to calculate, via machine learning, a model formula representing the relationship between an error between a predetermined stopping position and an actually-stopped position of a vehicle indicating the result of an automatic stop control, which controls the vehicle to stop at the predetermined stopping position using running-condition parameters, and the running-condition parameters used for the automatic stop control, a predictor configured to predict a stopping error with respect to the next stopping position, at which the vehicle currently running is going to stop, according to the model formula which is calculated in the past, and a controller configured to specify a changing parameter to be changed among the running-condition parameters and to update the changing parameter used for the automatic stop control with a correction value configured to correct the stopping error of the vehicle.

In the vehicle control device, the controller may update the changing parameter with the correction value configured to correct the stopping error of the vehicle, thus carrying out a calculation for the automatic stop control using the running-condition parameters including the changing parameter.

The vehicle control device may further include a stopping error calculation part configured to calculate the error between the predetermined stopping position and the actually-stopped position.

In the vehicle control device, the stopping error calculation part may calculate the error between the predetermined stopping position and the actually-stopped position based on an amount of machine operation achieved by the vehicle in a period of time between a time to detect a ground mark, which is located a predetermined distance before the predetermined stopping position, and a time to stop the vehicle.

In the vehicle control device, the stopping error calculation part may correct the stopping error calculated according to a relational formula which is set using a plurality of relationships between an actual error and an error predicted by the predictor in the past.

In the vehicle control device, the learning part may calculate the model formula via machine learning using the error and the running-condition parameters used for low-velocity control.

In the vehicle control device, the learning part may calculate the model formula using a machine-learning method adapted to the performance of the vehicle control device.

In the vehicle control device, the stopping error calculation part may record a value of the changing parameter before correction and a corrected value as the running-condition parameters.

In a second aspect of the invention, a vehicle control method includes: calculating, via machine learning, a model formula representing the relationship between an error between a predetermined stopping position and an actually-stopped position of a vehicle indicating the result of an automatic stop control, which controls the vehicle to stop at the predetermined stopping position using running-condition parameters, and the running-condition parameters used for the automatic stop control; predicting a stopping error with respect to the next stopping position, at which the vehicle currently running is going to stop, according to the model formula which is calculated in the past; and specifying a changing parameter to be changed among the running-condition parameters, thus updating the changing parameter used for the automatic stop control with a correction value configured to correct the stopping error of the vehicle.

In a third aspect of the invention, a program causes a computer of a vehicle control device to implement: a learning means configured to calculate, via machine learning, a model formula representing the relationship between an error between a predetermined stopping position and an actually-stopped position of a vehicle indicating the result of an automatic stop control, which controls the vehicle to stop at the predetermined stopping position using running-condition parameters, and the running-condition parameters used for the automatic stop control; a prediction means configured to predict a stopping error with respect to the next stopping position, at which the vehicle currently running is going to stop, according to the model formula which is calculated in the past; and a control means configured to specify a changing parameter to be changed among the running-condition parameters and to update the changing parameter used for the automatic stop control with a correction value configured to correct the stopping error of the vehicle.

Advantageous Effects of Invention

According to the present invention, it is possible to control a vehicle to stop at a predetermined stopping position accurately under various conditions.

BRIEF DESCRIPTION OF DRAWINGS

FIG. 5 is a drawing showing a data table stored on an error storage unit according to one embodiment of the present invention.

FIG. 7 is a flowchart showing a flow of determining learning algorithms according to one embodiment of the present invention.

DESCRIPTION OF EMBODIMENTS

First Embodiment

Hereinafter, a vehicle control device according to one embodiment of the present invention will be described with reference to the drawings.

Figure 1:
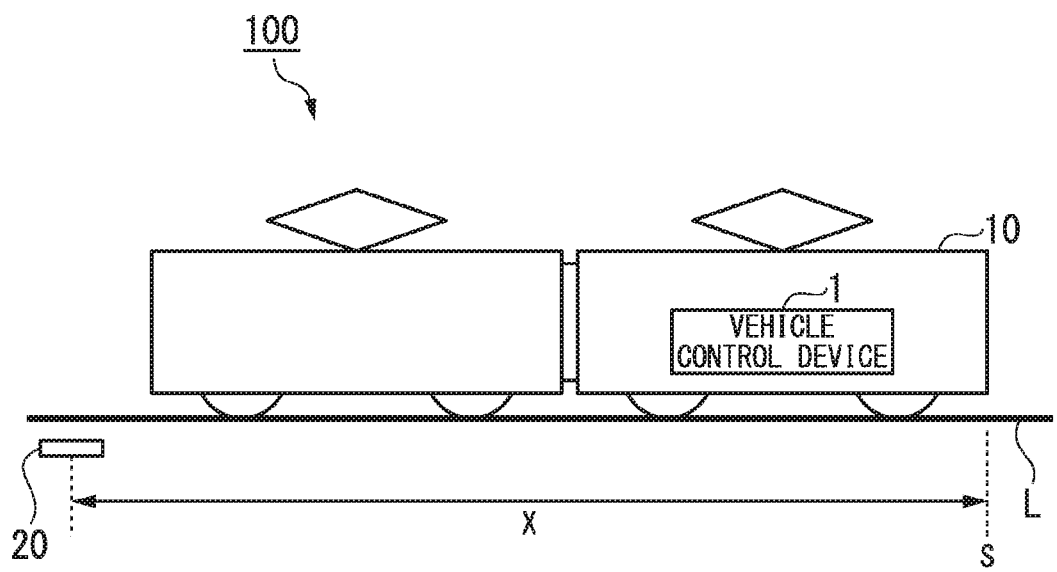
FIG. 1 is a schematic diagram showing a vehicle control system according to one embodiment of the present invention.

FIG. 1 is a schematic diagram showing a vehicle control system equipped with a vehicle control device according to the embodiment.

As shown in this drawing, a vehicle control system 100 includes at least a train 10, a vehicle control device 1 installed in the train 10, and a ground coil 20 located before a stopping position on a track L along which the train 10 may travel. The ground coil is an example of a ground marker.

For example, the vehicle control device 1 carries out an automatic stop control to adjust the top position of the train 10 to a predetermined stopping position S located on the track L. The vehicle control device 1 communicates with the ground coil 20 and measures the distance toward the stopping position S' from the point at which the train 10 passes through the ground coil 20, thus calculating a stopping error. The vehicle control device 1 may use the stopping error information, which was calculated in the past, for its subsequent stop control.

Figure 2:
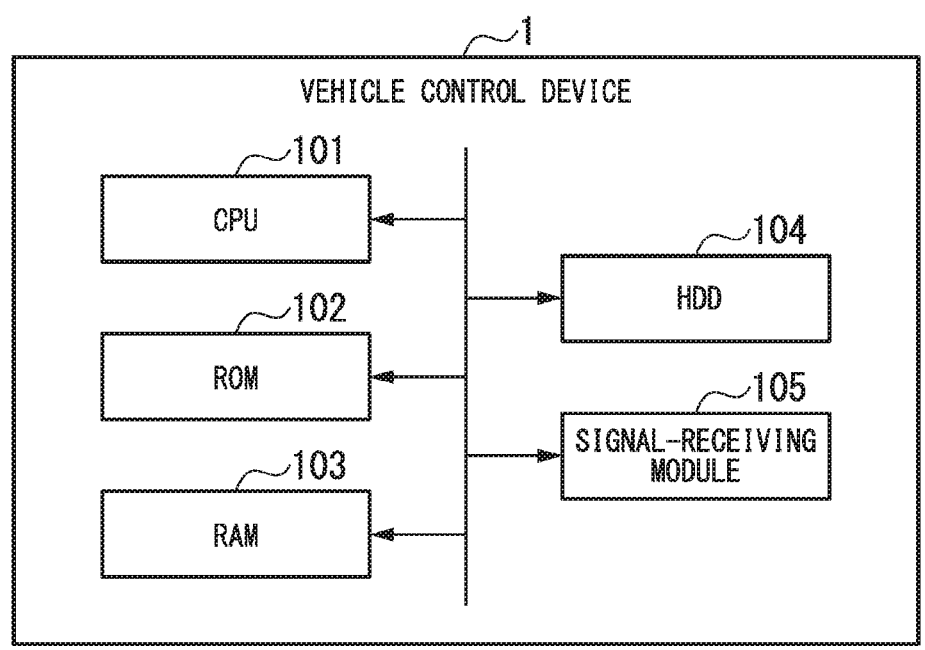
FIG. 2 is a block diagram showing a hardware configuration of a vehicle control device according to one embodiment of the present invention.

FIG. 2 is a block diagram showing the hardware configuration of the vehicle control device 1 according to the embodiment.

As shown in FIG. 2, the vehicle control device 1 is a computer including a CPU (Central Processing Unit) 101, a ROM (Read-Only Memory) 102, a RAM (Random-Access Memory) 103, a HDD (Hard-Disk Drive) 104, and a signal receiving module 105.

Figure 3:
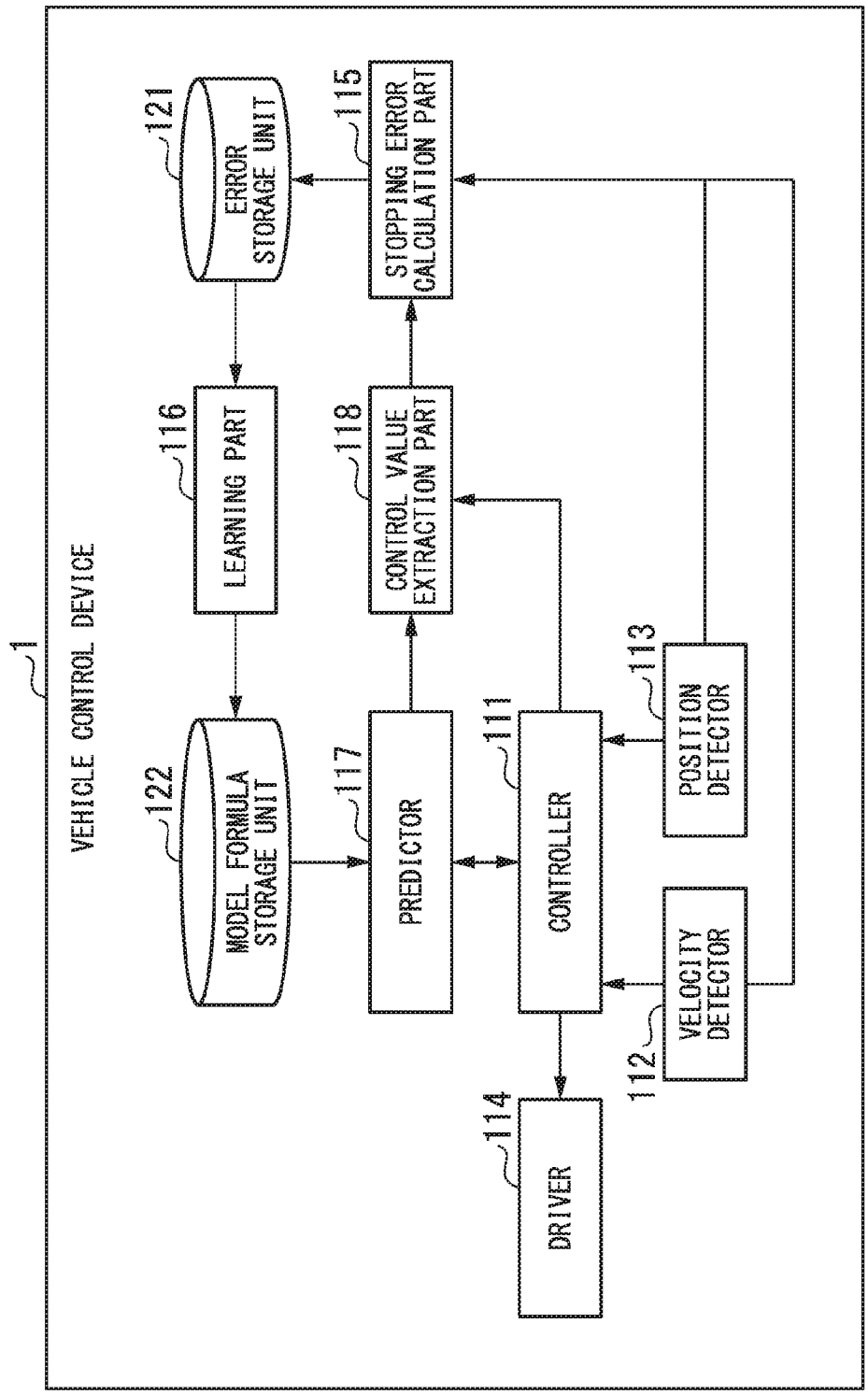
FIG. 3 is a functional block diagram of the vehicle control device according to one embodiment of the present invention.

FIG. 3 is a functional block diagram of the vehicle control device 1 according to the embodiment.

Upon executing programs preinstalled in the vehicle control device 1 with the CPU 101, the vehicle control device 1 may implement functional parts such as a controller 111, a velocity detector 112, a position detector 113, a driver 114, a stopping error calculation part 115, a learning part 116, a predictor 117, and a control value extraction part 118. In this connection, the functional parts can be formed using independent circuits.

In addition, the vehicle control device 1 further includes an error storage unit 121 and a model formula storage unit 122.

The controller 111 is configured to control other functional parts installed in the vehicle control device 1, wherein the controller carries out a control operation to determine a velocity pattern of the train 10.

The velocity detector 112 detects the velocity of the train 10.

The position detector 113 detects the position of the train 10.

The driver 114 drives drive-system equipment such as motors.

The stopping error calculation part 115 carries out an automatic stop control using running-condition parameters to stop the train 10 at the predetermined stopping position S, thus calculating a stopping error between the predetermined stopping position S and an actually-stopped position S' of the train 10 representing the controlling result.

The learning part 116 carries out machine learning to calculate a model formula representing the relationship between the stopping error and the running-condition parameters used for the automatic stop control.

The predictor 117 estimates a stopping error at the next stopping position.

The control value extraction part 118 extracts running-condition parameters used in the operations made by the controller 111 and the predictor 117.

In the present embodiment, the vehicle control device 1 carries out an automatic stop control using running-condition parameters to control the train 10 to stop at the predetermined stopping position S. The vehicle control device 1 calculates an error between the predetermined stopping position S and the actually-stopped position S' representing the controlling result, and therefore the vehicle control device 1 carries out machine learning to calculate a model formula representing the relationship between the error and the running-condition parameters used for the automatic stop control. The vehicle control device 1 estimates a stopping error at the next stopping position next to the current stopping position according to the model formula which was calculated in the past. The vehicle control device 1 specifies a changing parameter to be changed among running-condition parameters to update the changing parameter used for automatic stop control with a correction value to correct a stopping error of a running vehicle. Subsequently, the vehicle control device 1 carries out calculations for automatic stop control using running-condition parameters including the changing parameter being updated.

Figure 4:
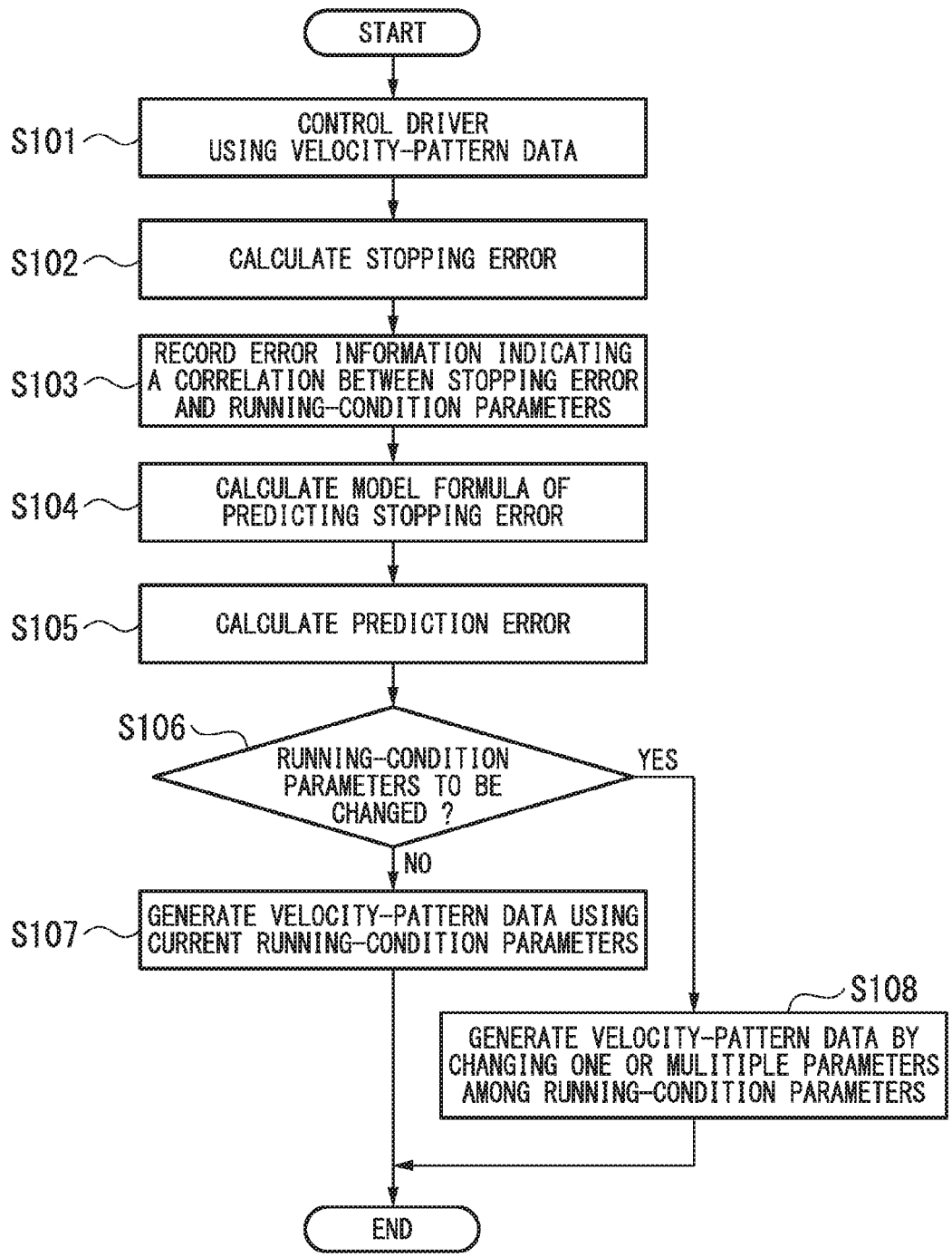
FIG. 4 is a flowchart showing the process of the vehicle control device according to one embodiment of the present invention.

FIG. 4 is a flowchart showing the process of the vehicle control device 1 according to the embodiment.

Next, a flow of processes implemented by the vehicle control device 1 will be described in order.

The controller 111 calculates velocity-pattern data representing the relationship between the velocity and the running position of the train 10 on the track L. Specifically, the controller 111 generates the velocity-pattern data using running-condition parameters such as the next stopping position S, the allowable velocity limit at each point toward the next stopping position S, and the acceleration for the stopping position. Using the velocity-pattern data, the controller 111 controls the driver 114 configured to drive motors and mechanical brakes (step S101).

The vehicle control device 1 communicates with the ground coil 20 when passing through the ground coil 20 located before the stopping position S on the track L. Upon receiving a ground-coil signal from the ground coil 20, the position detector 113 of the vehicle control device 1 sends the ground coil signal to the stopping error calculation part 115. The velocity detector 112 detects the velocity and sends it to the stopping error calculation part 115. The stopping error calculation part 115 calculates a distance X between the top position of the train 10 at the reception time to receive a signal from the ground coil 20 and the actually-stopped position S' (i.e. the top position of the train 10) based on a period of time between the reception time to receive a ground-coil signal and the stopping time as well as the velocity at each point of time. A distance Sd is a predetermined distance measured between the position to receive a signal from the ground coil 20 and the predetermined stopping position S. Therefore, the stopping error calculation part 115 produces a stopping error by subtracting the distance X from the distance Sd (step S102). In this connection, the stopping error calculation part 115 may input a stopped position from a detection device located at a platform so as to calculate S-S' as the distance (or stopping error) between the stopped position S' and the predetermined stopping position S located on the platform in advance. In this case, it is necessary to attach a detection device to the platform.

The control value extraction part 118 acquires from the controller 111 the running-condition parameters which are used to calculate the velocity-pattern data adapted to the automatic stop control. The control value extraction part 118 sends the running-condition parameters to the stopping error calculation part 115. The stopping error calculation part 115 records on the error storage unit 121 the error information indicating a correlation between the stopping error calculated in step S102 and the running-condition parameters acquired from the control value extraction part 118 (step S103). The stopping error calculation part 115 may record on the error storage unit 121 the error information in correlation with the information relating to a stop station for calculating the stopping error or a departure station before the stop station. The stopping error calculation part 115 carries out a recording process every time the train 10 stops at its stop station.

FIG. 5 is a drawing showing a data table stored on the error storage unit 121 according to the embodiment.

As shown in this drawing, the error storage unit 121 stores symbols and values with respect to departure stations, arrival stations, stopping errors, and running-condition parameters (e.g. parameter 1, parameter 2, . . . ). Specifically, running-condition parameters indicate various values of parameters used for calculating velocity-pattern data such as a distance from the position to start braking to the target stopping position S, a proportional gain of velocity control, and the like.

The learning part 116 carries out a machine-learning process using the information stored on the data table of the error storage unit 121 to calculate model formulae for stopping error prediction (step S104). As the machine learning, for example, it is possible to use the deep learning method, the random forest method, the LASSO method, and Q-Learning Method. The learning part 116 calculates and stores model formulae on the model formula storage unit 122. Every time the train 10 departs from the station, the learning part 116 carries out machine learning using the information, which was stored on the error storage unit 121 in the past, to calculate a model formula, thus updating the model formula already recorded on the model formula storage unit 122. Alternatively, the learning part 116 may carry out machine learning using the information, which was previously stored in the error storage unit 121 in the past, for each period of time to calculate a model formula, thus updating the model formula already recorded on the model formula storage unit 122.

The predictor 117 reads model formulae stored on the model formula storage unit 122. In addition, the predictor 117 acquires from the controller 111 the running-condition parameters used for calculating velocity-pattern data applied to traveling towards the next stopping station. The model formula is used to predict an error at the next stopping position by inputting running-condition parameters. The predictor 117 assigns the running-condition parameters, which are acquired from the controller 111, to the model formula so as to calculate a prediction error at the next stopping position (step S105). The predictor 117 may output to the control value extraction part 118 the running-condition parameters used for error prediction and the prediction error as the calculation result. The control value extraction part 118 may store a correlation between the running-condition parameters and the prediction error on the error storage unit 121. The predictor 117 outputs the prediction error at the next stopping position to the controller 111.

The controller 111 determines whether to change the running-condition parameters used for generating the velocity pattern based on the prediction error (step S106). When the prediction error is zero or the prediction error falls within a predetermined margin of error based on zero, the controller 111 may generate the velocity-pattern data using the current running-condition parameters without changing the running-condition parameters (step S107). When the prediction error exceeds the predetermined margin of error based on zero, the controller 111 determines to change the current running-condition parameters. The controller 111 changes one parameter or multiple parameters among the running-condition parameters so as to generate the velocity-pattern data whose prediction error is zero (step S108).

When the prediction error is +a (i.e. when it is predicted that the train 10 may be stopped by overrunning the next stopping position by a distance of +a), for example, the controller 111 specifies a changing parameter representing the distance from the position to start braking to the target stopping position S among the running-condition parameters, and therefore the controller 111 may calculate the velocity-pattern data by subtracting a value a from the changing parameter. Accordingly, it is possible to generate the velocity-pattern data whose prediction error is zero. The controller 111 specifies a changing parameter representing the braking force, and therefore the controller 111 may calculate the velocity-pattern data whose prediction error is corrected to zero by changing the braking force. In addition, the controller 111 may specify other changing parameters, and therefore the controller 111 may calculate the velocity-pattern data whose prediction error is corrected to zero by changing the values of those changing parameters.

According to the above process of the vehicle control device 1, it is possible to calculate a prediction error of stoppage at the next stopping position via machine learning using a stopping error. Accordingly, the vehicle control device 1 may achieve drive control to decrease a stopping error at the next stopping position by calculating the velocity-pattern data using the running-condition parameters configured to correct a prediction error.

Second Embodiment

A certain degree of accuracy is needed for accuracy of calculating a stopping error. However, it is preferable to prevent a special sensor from being attached to the stopping station for the purpose of improving accuracy since the special sensor may bring a high cost. For this reason, a manager of the vehicle control device 1 may measure a correlation between an actual error and a prediction error predicted by the vehicle control device 1, and therefore the manager may generate a conversion equation representing a correction error corresponding to the prediction error using the measurement result and records it on the vehicle control device 1.

Figure 6:
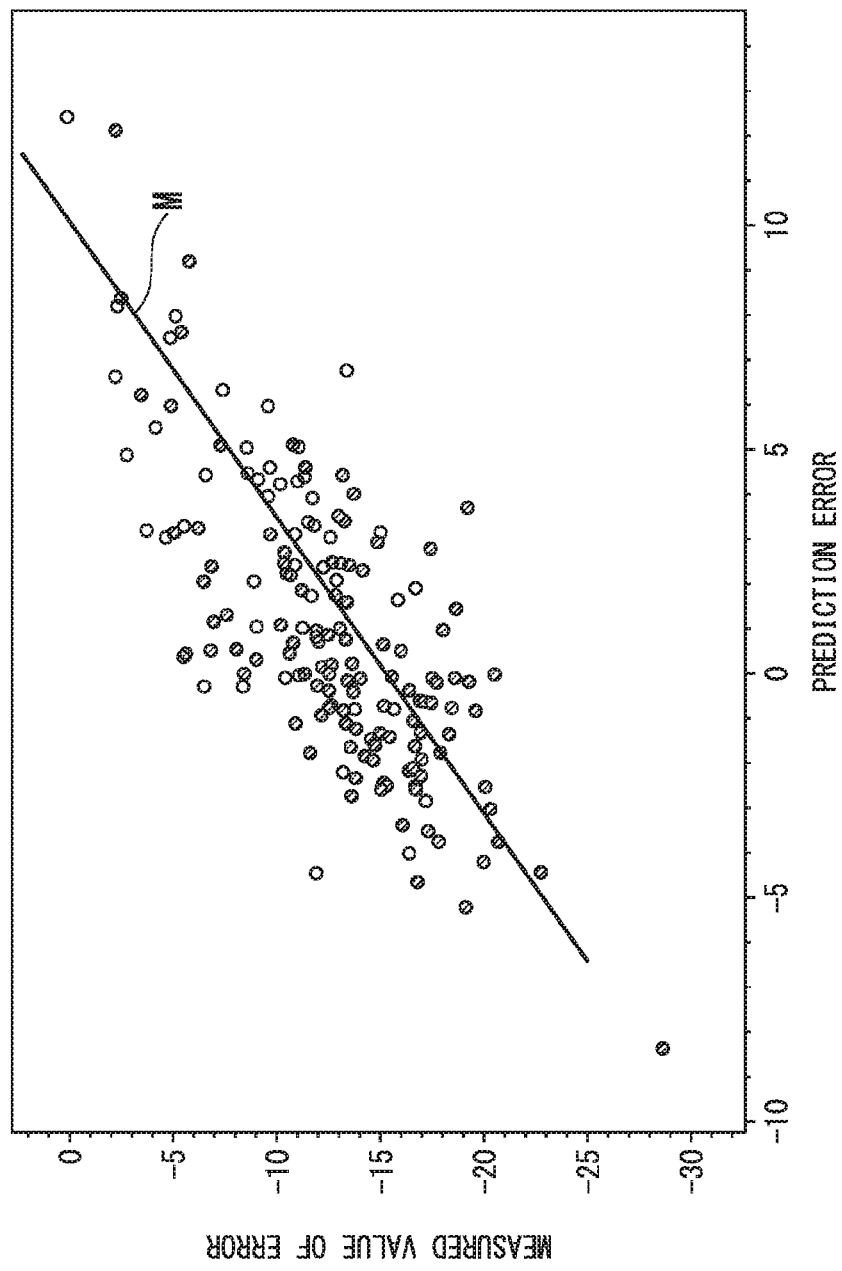
FIG. 6 is a graph showing the relationship between prediction errors and measured values of errors according to one embodiment of the present invention.

FIG. 6 is a graph showing a correlation between a measured value of error and a prediction error according to the second embodiment.

The manager may obtain multiple correlations between the measured values of error and the prediction errors, based on which it is possible to generate a formula representing a linear-approximation curve M shown in FIG. 6. The manager may record the linear-approximation curve M on the vehicle control device 1.

The stopping error calculation part 115 inputs a pulse signal from a motor-rotation frequency meter at the timing of receiving a ground-coil signal from the position detector 113. A running distance for each pulse in a pulse signal is determined in advance. A running distance D for each pulse can be calculated by Equation (1).

$$D = \text{Wheel Diameter} \times \pi \div \text{Gear Ratio} \div \text{Total Number of Pulses for each Rotation of Motor} \quad (1)$$

The stopping error calculation part 115 calculates a distance X measured from the position to receive a signal from the ground coil 20 to the stopped position S' by Equation (2).

$$X = \text{Pulse-Count Number} \times D \quad (2)$$

The stopping error calculation part 115 calculates an error by subtracting a distance X' calculated by Equation (2) from the known distance X measured from the top position of a vehicle at the position to receive a signal from the ground coil 20 to the predetermined stopping position S. The stopping error calculation part 115 corrects the error using the linear-approximation curve M into a corrected error corresponding to the measured value. The stopping error calculation part 115 determines the corrected error as a stopping error.

Third Embodiment

In the vehicle control device 1, the control value extraction part 118 may acquire a running-condition parameter, which is used for controlling the train 10 at low velocity among running-condition parameters used for the stoppage control of the controller 111, as a running-condition parameter used for machine learning. For example, the controller 111 acquires TASC for stopping a vehicle, a TASC control such as a remaining distance, a load, and a road-surface resistance for controlling final velocity, and running-condition parameters unique to final-velocity control. Herein, TASC stands for Train Automatic Stop-position Control. The final-velocity control is a stoppage control in a velocity region which is difficult to control a physical model. The low-velocity control may cause deviations (or noise) between the actual velocity and the velocity detected by the controller 111. By carrying out machine learning using the running-condition parameters used for low-velocity control, it is possible to calculate a model formula used for calculating a prediction error without causing a large impact on accuracy of stoppage irrespective of noise occurring in velocity.

Fourth Embodiment

The machine learning method used for the learning part 116 may depend on the number of running-condition parameters and the existence/absence of variables having an extremely strong relationship to accuracy of stoppage.

For example, it is determined whether any variables having an extremely strong relationship to accuracy of stoppage may exist (step S401), wherein if YES, it is possible to use a regression learning method such as a LASSO method. In the absence of variables having an extremely strong relationship to accuracy of stoppage (step S401: NO), it is determined whether the number of running-condition parameters is an extremely large number such as one hundred or more (step S402), wherein if YES, it is possible to use a feature quantity learning method such as a deep learning method. When NO in step S402, it is determined whether the number of running-condition parameters is an extremely small number such as a few or less (step S403). When YES in step S403, it is possible to use an ensemble learning method such as a random forest method, wherein if NO, it is possible to use a reinforcement learning method such as a Q-Learning method.

Accordingly, it is possible to select a learning algorithm adapted to a manner of performance of the vehicle control device 1 in consideration of different manners of controls and restrictions to memory for each vehicle control device 1. Upon receiving the information representing the processing performance of the vehicle control device 1 and the number of parameters used for machine learning, the learning part 116 may automatically determine the machine-learning method according to the aforementioned flow of processes based on the information.

Fifth Embodiment

As described in the first embodiment, the controller 111 is configured to specify a changing parameter and to correct the changing parameter into a corrected value whose prediction error is zero. The control value extraction part 118 acquires a value before changing the correction value of the changing parameter and another value after changing as running-condition parameters, and therefore the stopping error calculation part 115 may record the running-condition parameters used for machine learning on the error storage unit 121.

Due to the above adjustment, it is possible for the learning part 116 to produce a model formula configured to calculate a prediction error accurately.

According to the foregoing embodiments, it is possible to control a vehicle to stop at the predetermined stopping position accurately under various conditions.

The aforementioned vehicle control device 1 is designed to control the running velocity of the train 10 running on the track L, however, the vehicle control device 1 may control the running velocity for other types of vehicles according to similar processes. For example, the vehicle control device 1 may control a regular-service bus.

The vehicle control device 1 may include a computer system therein. Programs causing the vehicle control device 1 to achieve the foregoing functions can be stored on computer-readable storage media installed in the vehicle control device 1, whereby a computer of the vehicle control device 1 may read and execute programs to achieve the foregoing functions. Herein, computer-readable storage media may include magnetic disks, magneto-optic disks, CD-ROM, DVD-ROM, and semiconductor memory. In addition, it is possible to distribute computer programs to a computer through communication lines, and therefore the computer may receive and execute programs.

The foregoing programs may achieve part of functions implemented by the foregoing functional parts. Moreover, the foregoing programs may be so-called differential files (or differential programs) which can be combined with pre-installed programs of a computer system to achieve the foregoing functions.

INDUSTRIAL APPLICABILITY

The present invention relates to a vehicle control device, a vehicle control method, and a program which can control a vehicle to stop at a predetermined stopping position accurately under various conditions.

REFERENCE SIGNS LIST

1 . . . vehicle control device, 10 . . . train, 20 . . . ground coil, 111 . . . controller, 112 . . . velocity detector, 113 . . . position detector, 114 . . . driver, 115 . . . stopping error calculation part, 116 . . . learning part, 117 . . . predictor, 118 . . . control value extraction part, 121 . . . error storage unit, 122 . . . model formula storage unit

The invention claimed is:

1. A vehicle control device comprising:
a learning part configured to calculate, via machine learning, a model formula representing a relationship between an error between a predetermined stopping position and an actually-stopped position of a vehicle indicating a result of an automatic stop control, which controls the vehicle to stop at the predetermined stopping position using running-condition parameters, and the running-condition parameters used for the automatic stop control;
a predictor configured to predict a stopping error with respect to a next stopping position, at which the vehicle currently running is going to stop, according to the model formula which is calculated in the past; and
a controller configured to specify a changing parameter to be changed among the running-condition parameters and to update the changing parameter used for the automatic stop control with a correction value configured to correct the stopping error of the vehicle.

2. The vehicle control device according to claim 1, wherein the controller updates the changing parameter with the correction value configured to correct the stopping error of the vehicle, thus carrying out a calculation for the automatic stop control using the running- condition parameters including the changing parameter.

3. The vehicle control device according to claim 1, further comprising a stopping error calculation part configured to calculate the error between the predetermined stopping position and the actually-stopped position.

4. The vehicle control device according to claim 3, wherein the stopping error calculation part is configured to calculate the error between the predetermined stopping position and the actually-stopped position based on an amount of machine operation achieved by the vehicle in a period of time between a time to detect a ground mark, which is located a predetermined distance before the predetermined stopping position, and a time to stop the vehicle.

5. The vehicle control device according to claim 3, wherein the stopping error calculation part is configured to correct the stopping error calculated according to a relational formula which is set using a plurality of relationships between an actual error and the error predicted by the predictor in the past.

6. The vehicle control device according to claim 3, wherein the stopping error calculation part is configured to record a value of the changing parameter before correction and a corrected value as the running-condition parameters.

7. The vehicle control device according to claim 1, wherein the learning part is configured to calculate the model formula via the machine learning using the error and the running-condition parameters used for low-velocity control.

8. The vehicle control device according to claim 1, wherein the learning part is configured to calculate the model formula using a machine-learning method adapted to a performance of the vehicle control device.

9. A computer-readable storage medium having stored therein a program causing a computer of a vehicle control device to implement:
a learning process configured to calculate, via machine learning, a model formula representing a relationship between an error between a predetermined stopping position and an actually-stopped position of a vehicle indicating a result of an automatic stop control, which controls the vehicle to stop at the predetermined stopping position using running-condition parameters, and the running-condition parameters used for the automatic stop control;
a prediction process configured to predict a stopping error with respect to a next stopping position, at which the vehicle currently running is going to stop, according to the model formula which is calculated in the past; and
a control process configured to specify a changing parameter to be changed among the running-condition parameters and to update the changing parameter used for the automatic stop control with a correction value configured to correct the stopping error of the vehicle.

10. A vehicle control method comprising:
calculating, via machine learning, a model formula representing a relationship between an error between a predetermined stopping position and an actually-stopped position of a vehicle indicating a result of an automatic stop control, which controls the vehicle to stop at the predetermined stopping position using running-condition parameters, and the running-condition parameters used for the automatic stop control;

predicting a stopping error with respect to a next stopping position, at which the vehicle currently running is going to stop, according to the model formula which is calculated in the past; and specifying a changing parameter to be changed among the running-condition parameters, thus updating the changing parameter used for the automatic stop control with a correction value configured to correct the stopping error of the vehicle.

\* \* \* \* \*